Dec. 2, 1952  P. J. LOMBARD, JR  2,619,993
DRILL THROUGH TAILSTOCK SPINDLE FOR WOOD-TURNING LATHES
Filed Oct. 22, 1948
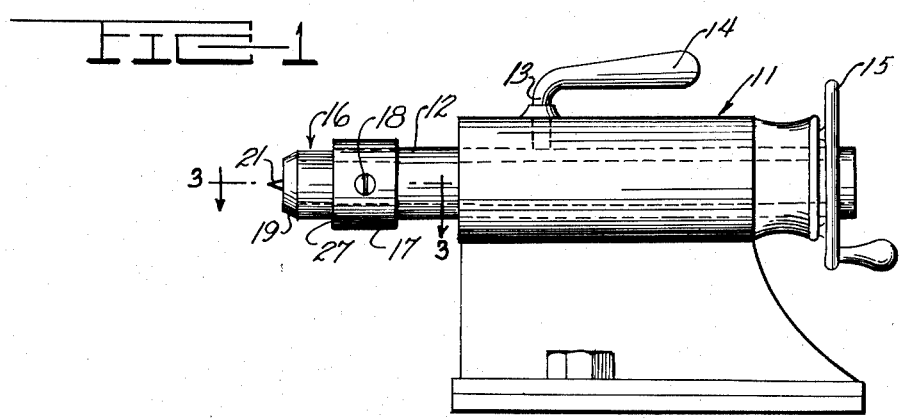
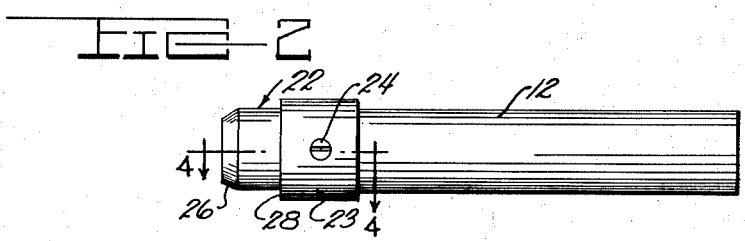
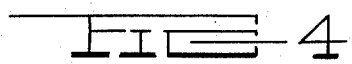
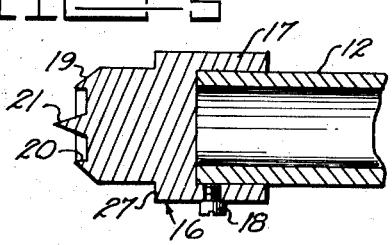
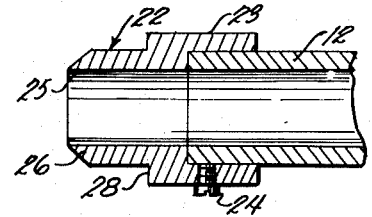
*INVENTOR.*
PAUL J. LOMBARD, JR
BY
*McMorrow, Berman & Davidson*
ATTORNEYS Patented Dec. 2, 1952

2,619,993

UNITED STATES PATENT OFFICE 2,619,993

DRILL THROUGH TAILSTOCK SPINDLE FOR WOOD-TURNING LATHES

Paul J. Lombard, Jr., Winnebago, Nebr.

Application October 22, 1948, Serial No. 56,036

2 Claims. (Cl. 142—53)

This invention relates to wood-turning lathes, and more particularly to tail-stock structure for a wood-turning lathe.

A main object of the invention is to provide a novel and improved tail-stock structure for a wood-turning lathe enabling a bore to be drilled in a wood turning by the insertion of a drill through the tailstock, said structure being very simple, easy to manipulate, and providing a means to accurately form an axial bore of any desired length in a wood turning.

A further object of the invention is to provide an improved tailstock structure for a wood turning lathe providing a means for securely supporting a wood turning while an axial bore is being drilled therethrough from the tailstock end thereof, said improved structure involving only a few simple parts, which are easy to assemble and manipulate.

Further objects and advantages of the invention will become apparent from the following description and claims, and from the accompanying drawings, wherein:

Figure 1 is a side elevational view of a wood-turning lathe tailstock constructed in accordance with the present invention showing the solid point center element secured therein.

Figure 2 is an elevational view of the hollow spindle of the tailstock of Figure 1, showing a hollow center element secured therein.

Figure 3 is an enlarged cross-sectional detail view taken on line 3—3 of Figure 1.

Figure 4 is an enlarged cross-sectional detail view taken on line 4—4 of Figure 2.

Referring to the drawings, 11 designates the tailstock of a wood-turning lathe, said tailstock being bored axially and receiving a hollow tubular spindle 12 which may be clamped in the tailstock by a set screw member 13 having a handle 14. The tailstock has conventional means, controlled by a hand wheel 15, for adjusting the spindle 12 axially.

Designated at 16 is a solid point center member formed with a sleeve portion 17, in which the end of spindle 12 is telescopically receivable, and provided with a set screw 18 for securing the member 16 rigidly to said spindle. Member 16 has a conical bevel 19 and terminates in a counterbore 20 from the center of which projects the conical solid center point 21.

Designated at 22 is a hollow center member which may be employed in place of member 16. Member 22 is formed with a sleeve 23 in which the end of spindle 12 is telescopically receivable, and said sleeve 23 is provided with a set screw 24 for securing member 22 rigidly to spindle 12. Member 22 is formed with a bore 25 which is registered with the bore of spindle 12. The diameter of the counterbore 20 is identical in diameter to the bore 25 and the bore of spindle 12.

Member 22 has a conical bevel 26 which is identical with the conical bore 19 of member 16.

In employing the lathe structure above described, the wood piece being worked is turned to its desired shape in the usual manner, employing the tailstock arrangement shown in Figures 1 and 3. During this process, the end of the piece will be formed with a conical central indentation by solid point 21 and also with an annular indentation by the annular edge defined by bevel 19 and counterbore 20. After the outside shaping of the piece is completed, the solid point center member 16 is removed from spindle 12 and is replaced by the hollow center member 22, the annular edge defined by bevel 26 and bore 25 fitting into the annular indentation previously formed in the end of the piece by member 16. A long drill bit (not shown) provided with a suitable handle for holding same is then inserted through the hollow spindle 12 from the outboard end thereof, the point of the drill entering the conical central indentation left in the end of the piece by the conical solid point 21. The drill is fed into the piece by exerting axial pressure inwardly thereon. It will be noted that during the drilling process, the piece is held solidly at each end and is rotated by the live center of the lathe. The operator holds the drill bit against rotating as he feeds the bit inwardly. Since the dill bit is non-rotative and the work piece rotates, the bit cuts an axial bore in the piece, and said axial bore may be made to any desired length by feeding the drill bit inwardly a distance corresponding to the length of bore desired in the piece.

It will be noted that both members 16 and 22 are formed with annular shoulders, shown respectively at 27 and 28. Said shoulders limit penetration of the members 16 and 22 into the end of the work piece, especially where the work piece is made of soft wood.

While a specific embodiment of a tailstock structure for a wood-turning lathe has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a wood turning lathe, a tailstock having a tubular spindle having a bore opening through both ends thereof, a tubular center member having a bore opening through both ends thereof, one end of the center member having means for engaging a work piece, the bore of the center member being similar in diameter to the bore of the tailstock spindle, said center member having an enlarged diameter axial sleeve on the end opposite said means receiving an end of said spindle so as to mount the center member on the spindle with the bore of the center member registered with the bore of the spindle whereby a drill bit can be inserted through the said bores from the other end of the tail stock spindle and operated therein to drill the work piece, and means acting between said center member and said spindle for locking the same together.

2. In a wood turning lathe, a tailstock having a tubular spindle having a bore opening through both ends thereof, a tubular center member having a bore opening through both ends thereof, one end of the center member having means for engaging a work piece, the bore of the center member being similar in diameter to the bore of the tailstock spindle, said center member having an enlarged diameter axial sleeve on the end opposite said means receiving an end of said spindle so as to mount the center member on the spindle with the bore of the center member registered with the bore of the spindle whereby a drill bit can be inserted through the said bores from the other end of the tail stock spindle and operated therein to drill the work piece, and means acting between said center member and said spindle for locking the same together, said enlarged diameter sleeve being sufficiently larger in outside diameter than said center member to define a stop shoulder at one end of said sleeve to engage a work piece and limit penetration of the center member into the work piece during operation of the lathe.

PAUL J. LOMBARD, Jr.

REFERENCES CITED

The following references are of record in the file of this patent:

UNITED STATES PATENTS

| Number | Name | Date |
| --- | --- | --- |
| 194,638 | Barker | Aug. 28, 1877 |
| 624,930 | Harris | May 16, 1899 |
| 855,858 | Larson | June 4, 1907 |
| 875,328 | Courtney | Dec. 31, 1907 |
| 1,513,350 | Stolle | Oct. 28, 1924 |
| 1,596,708 | Bellows | Aug. 17, 1926 |
| 1,661,017 | Stolle | Feb. 28, 1928 |